US007735950B2

(12) United States Patent
Tabata et al.

(10) Patent No.: US 7,735,950 B2

(45) Date of Patent: Jun. 15, 2010

(54) PRINTING APPARATUS AND PRINTING MEDIUM CONVEYING APPARATUS

(75) Inventors: Kunio Tabata, Shiojiri (JP); Toshiyuki Suzuki, Shiojiri (JP); Atsushi Oshima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 11/846,416

(22) Filed: Aug. 28, 2007

(65) Prior Publication Data

US 2008/0049054 A1 Feb. 28, 2008

(30) Foreign Application Priority Data

Aug. 28, 2006 (JP) ............................ 2006-230461
Aug. 17, 2007 (JP) ............................ 2007-212552

(51) Int. Cl.
*B41J 29/38* (2006.01)
*B41J 2/155* (2006.01)
*G11B 9/00* (2006.01)

(52) U.S. Cl. .......................... 347/16; 347/42; 346/74.5

(58) Field of Classification Search .................. 347/16, 347/42; 346/74.5
See application file for complete search history.

(56) References Cited

U.S. PATENT DOCUMENTS

2001/0055040 A1 12/2001 Nojima
2003/0128253 A1 7/2003 Kitahara et al.

FOREIGN PATENT DOCUMENTS

| | | | |
|---|---|---|---|
| EP | 1522414 A1 | | 4/2005 |
| EP | 1683644 A1 | | 7/2006 |
| JP | 07-195783 | | 8/1995 |
| JP | 2001-125333 | | 5/2001 |
| JP | 2001125333 A | * | 5/2001 |
| JP | 2006-96429 | | 4/2006 |

* cited by examiner

*Primary Examiner*—Matthew Luu
*Assistant Examiner*—Jannelle M Lebron
(74) *Attorney, Agent, or Firm*—Workman Nydegger

(57) ABSTRACT

A printing apparatus that conveys a printing medium placed on a surface of a conveyor belt, and performs printing to the printing medium by ejecting a liquid from a liquid ejection head, the apparatus includes: a magnetic recording layer that is formed to the conveyor belt as a continuous strip; a magnetic reproduction head that is disposed opposing the magnetic recording layer of the conveyor belt; and a control unit that detects recording details reproduced from the magnetic recording layer by the magnetic reproduction head. In the printing apparatus, the magnetic recording layer is recorded with the recording details about a magnetic pole change of a predetermined pattern, and is partially recorded with the recording details about a magnetic pole change different from the change of the predetermined pattern, and the control unit detects a movement status of the conveyor belt from any of the recording details reproduced from the magnetic recording layer by the magnetic reproduction head specifically about the magnetic pole change of the predetermined pattern, and detects a reference position of the conveyor belt therefrom specifically about the magnetic pole change different from the change of the predetermined pattern.

4 Claims, 7 Drawing Sheets

PRINTING APPARATUS AND PRINTING MEDIUM CONVEYING APPARATUS

BACKGROUND

1. Technical Field

The present invention relates to a printing apparatus and a printing medium conveying apparatus that print any predetermined text, images, and others or a printing medium by forming minute particles (dots) thereon through ejection of a small amount of liquid from a plurality of nozzles.

2. Related Art

With the reason of the relatively inexpensive price and the ease of achieving high-quality color printing, an inkjet printer being an example of such a printing apparatus has become widely popular not only for office use but also for personal use with the spread of personal computers, digital cameras, and others.

Such an inkjet printer generally creates any desired printed matter with minute ink dots formed on a printing medium. More in detail, a moving element referred to as carriage or others includes an ink cartridge and a printing head (liquid ejection head) as a piece. Such a moving element ejects a liquid ink from a nozzle formed to the printing head while moving back and forth on the printing medium in the direction orthogonal to the direction of conveying the printing medium so that small ink dots are formed on the printing medium. If the carriage is provided with ink cartridges of four colors, i.e., black, yellow, magenta, and cyan, and their each corresponding printing heads, full-color printing becomes easily possible in addition to monochrome printing.

With an inkjet printer of a type using no carriage but a printing head of the length same as the width of the printing medium, there is no need to move the printing head in the width direction of the printing medium. This accordingly enables printing with a so-called single path, thereby favorably leading to high-speed printing as can be with laser printers. Note here that the inkjet printer of the former type is generally referred to as "multi-path (serial) inkjet printer", and the ink jet printer of the latter type as "line-head inkjet printer".

A line-head inkjet printer is often configured to place a printing medium on a conveyor belt for conveying. With such a configuration of placing a printing medium on a conveyor belt for conveying, to achieve printing with high image quality through ejection of a liquid ink onto an incoming printing medium from the printing head, there needs to detect the position of the printing medium with good accuracy. For this purpose, generally, the conveyor belt is provided with a mark for detection of the movement status, i.e., movement amount and speed such as linear scale. The mark is read by an encoder so that the position of the conveyor belt is detected, and from the detected position of the conveyor belt, the position of a printing medium is detected. For such detection, however, there needs to set a reference position for the conveyor belt for use as a position reference for the printing medium because the conveyor belt is generally endless. In consideration thereof, with an inkjet printer described in JP-A-2006-96429, a conveyor belt is provided with a tab for use as a position reference of the conveyor belt through detection thereof by a sensor, and control is so exercised as to place a printing medium not on the seam of the belt.

The problem with the previous technology typified by JP-A-2006-96429 is that there needs to include two sensors, i.e., a sensor for detecting the movement status of the conveyor belt, and a sensor for detecting the reference position of the conveyor belt, thereby complicating the configuration and increasing the cost.

SUMMARY

An advantage of some aspects of the invention is to provide a printing apparatus and a printing medium conveying apparatus that can detect, by a single sensor, the movement status of a conveyor belt and the reference position thereof.

According to an aspect of the invention, a printing apparatus or a printing medium conveying apparatus conveys a printing medium placed on the surface of a conveyor belt, and performs printing to the printing medium by ejecting a liquid from a liquid ejection head. The apparatus includes: a magnetic recording layer that is formed to the conveyor belt as a continuous strip; a magnetic reproduction head that is disposed opposing the magnetic recording layer of the conveyor belt; and a control unit that detects recording details reproduced from the magnetic recording layer by the magnetic reproduction head. In the apparatus, the magnetic recording layer is recorded with the recording details about a magnetic pole change of a predetermined pattern, and is partially recorded with the recording details about a magnetic pole change different from the change of the predetermined pattern, and the control unit detects the movement status of the conveyor belt from any of the recording details reproduced from the magnetic recording layer by the magnetic reproduction head specifically about the magnetic pole change of the predetermined pattern, and detects the reference position of the conveyor belt therefrom specifically about the magnetic pole change different from the change of the predetermined pattern.

When the recording details about the magnetic pole change of the predetermined pattern show that a magnetic pole is changed with a predetermined recording pitch, preferably, the recording details about a magnetic pole change different from the change by the predetermined recording pitch show that the magnetic pole is changed by a recording pitch being an integral submultiple of the predetermined recording pitch.

When the recording details about the magnetic pole change of the predetermined pattern show that a recording duty of one magnetic pole in a period of the magnetic pole change is constant, preferably, the recording details about a magnetic pole change different from the change of the predetermined pattern show that a recording duty of the remaining magnetic pole in a period of the magnetic pole change is set different.

According to the printing apparatus and the printing medium conveying apparatus of the aspect of the invention, a single sensor can detect the movement status of a conveyor belt from any magnetic pole change of a predetermined pattern, and the reference position of the conveyor belt from a magnetic pole change different from that of the predetermined pattern.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will describe by referring to the accompanying drawings with a printing apparatus that ejects a liquid onto a printing medium for printing of text, images, and others.

Figure 1:
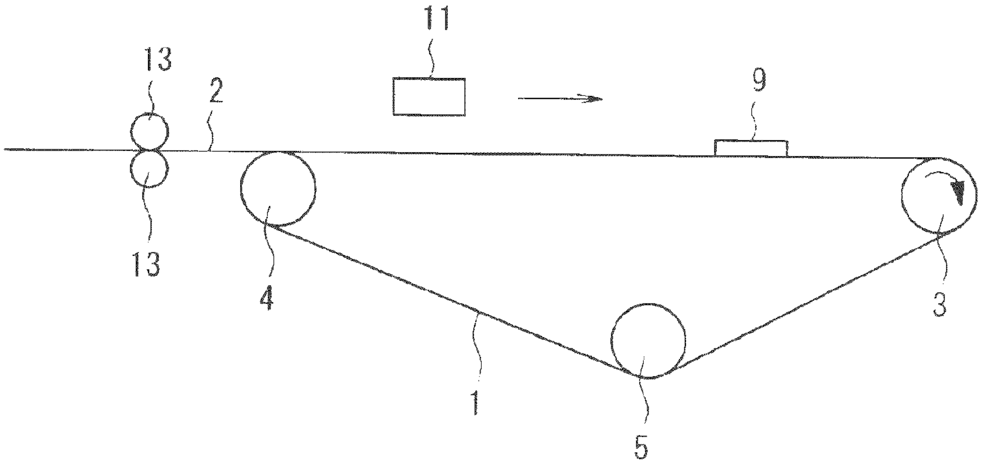
FIG. 1 is a front view of a printing apparatus, showing the schematic configuration thereof in an embodiment to which a conveying apparatus according to an aspect of the invention is applied.
Figure 2:
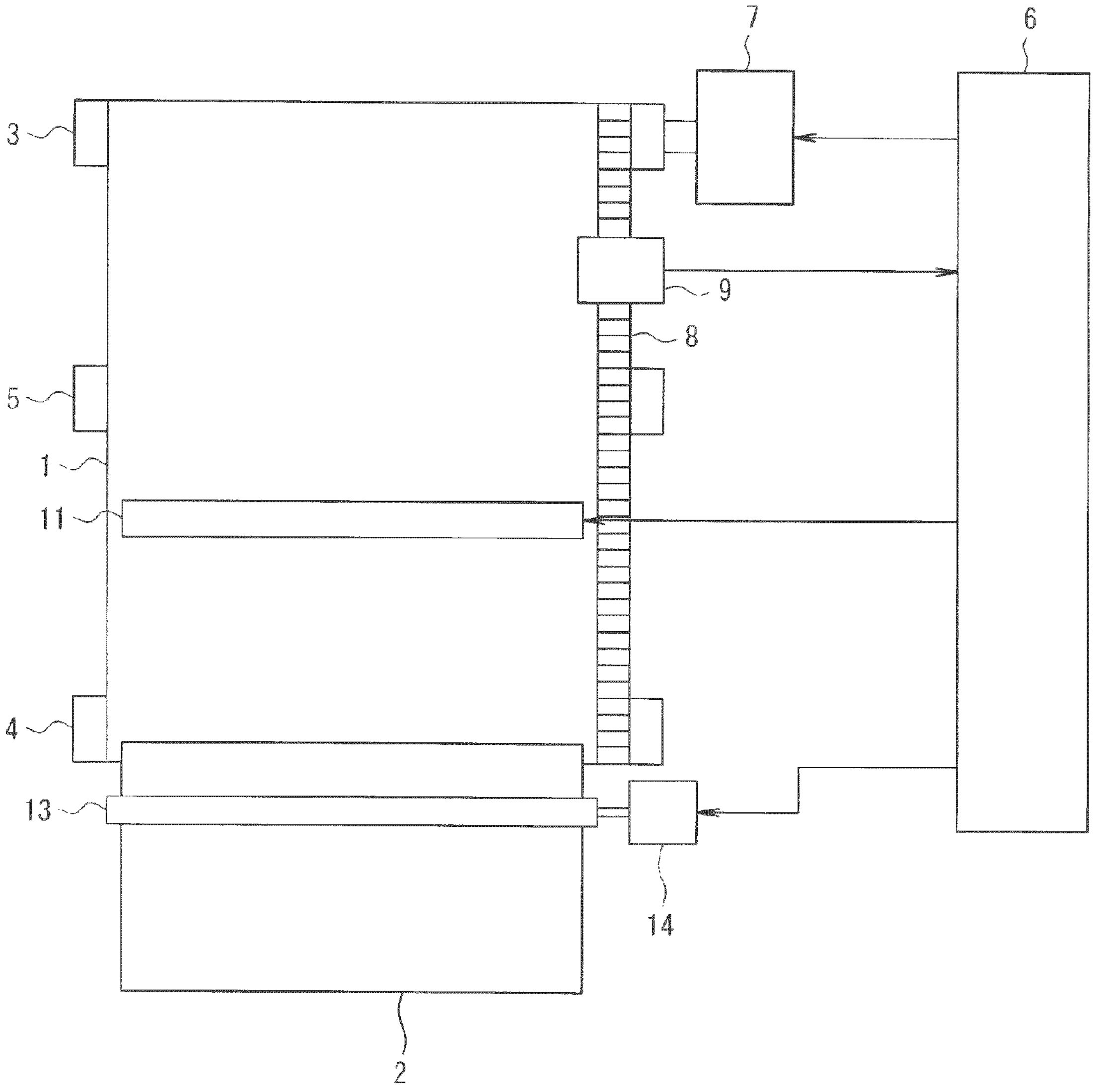
FIG. 2 is a plan view of the printing apparatus of FIG. 1.

FIG. 1 is a front view of a printing apparatus showing the schematic configuration thereof in an embodiment, and FIG. 2 is a plan view thereof. In the drawings, a reference numeral 1 denotes an endless conveyor belt for conveying of a printing medium 2 such as printing paper. This conveyor belt 1 is of insulation, and is configured by insulative resin including PET (polyethylene terephthalate), polyimide, fluorocarbon resin, and others. This conveyor belt 1 is wound around several rollers, i.e., a drive roller 3 disposed at the right end portion of FIG. 1, a follower roller 4 disposed at the left end portion of FIG. 1, and a tension roller 5 disposed beneath and between these rollers. The drive roller 3 is rotate-driven by a drive roller motor 7 of FIG. 2 in the direction of an arrow of FIG. 1, and the printing medium 2 is electrostatically adhered to the conveyor belt 1, which is electrically charged by an electric-change unit (not shown) such as electric-charge roller. The printing medium 2 being electrostatically adhered as such is conveyed from the left side of the drawing to the right side thereof, i.e., in the direction of the arrow. The follower roller 4 is grounded for voltage application to the conveyor belt 1 while sandwiching the belt with a portion coming in contact with the electric-charge unit (not shown) such as electric-charge roller. The tension roller 5 is biased downward by a spring that is not shown, thereby providing the tension to the conveyor belt 1.

The conveyor belt 1 is so disposed as to come in contact with an electric-charge roller (not shown) serving as the electric-charge unit, i.e., disposed to oppose the follower roller 4. The electric-charge roller is connected with an alternating-current power supply. With such a placement, the electric-charge roller is disposed directly before the paper-feed position for a printing medium. Accordingly, when the electric-charge roller is applied with a current at a potential that is inverted at every predetermined period, the surface of the conveyor belt 1 is electrically-charged, i.e., banded charge, while being alternately changed in potential along the conveyance direction. The resulting electric charges each cause dielectric polarization to the printing medium 2, and a closed-circuit is so configured as to include the resulting electric charges by the dielectric polarization, i.e., an electric charge of the printing medium 2 and that on the surface of the conveyor belt 1, and any adjacent electric charge on the surface of the conveyor belt 1 and that of the printing medium 2. As a result, an electrostatic power is generated so that the printing medium 2 is made to adhere to the surface of the conveyor belt 1. Note here that the electric-charge pattern is not restrictive to a pattern of bands alternating in the conveyance direction of the printing medium 2, and other possible options include a pattern of bands alternating in a direction orthogonal to the conveyance direction of the printing medium 2, a checkered pattern, and others.

On the upstream side of the follower roller 4 in the conveyance direction of the printing medium 2, a gate roller 13 is disposed. This gate roller 13 serves to adjust the timing of directing, onto the conveyor belt 1, the printing medium 2 provided from a paper-feed section, and to correct any distortion of the printing medium 2 with respect to the conveyance direction, i.e., so-called skew. The gate roller 13 is rotate-driven by a gate roller motor 14 of FIG. 2. The printing medium 2 comes in contact with a nip portion, i.e., junction portion, with the not-rotating gate roller 13, and is deformed when it is conveyed. With the deformation is released, the skew of the printing paper 2 is corrected. After skew correction as such, the gate roller motor 14 rotate-drives the gate roller 13 so that the printing medium 2 is conveyed onto a predetermined position on the conveyor belt 1.

After being conveyed to the conveyor belt 1 at the predetermined position, the printing medium 2 is directed to a printing area while being adhered to the conveyor belt 1 with the electrostatic power described above. The printing area is located on the downstream side of the conveyance direction. In the printing area, a liquid ejection head 11 is disposed, and when the printing medium 2 reaches a nozzle position, the nozzle of the liquid ejection head 11 responsively ejects a liquid so that a printing job is executed. The nozzle position is located on the most upstream side of the liquid ejection head 11 in the conveyance direction of the printing medium.

This liquid ejection head 11 is provided for each of a plurality of colors, e.g., yellow (Y), magenta (M), cyan (C), light magenta (Lm), light cyan (Lc), black (K), and others. These liquid ejection heads 11 are so disposed that rows of nozzles are slightly misaligned in the conveyance direction of the printing medium 2. The liquid ejection heads 11 are each provided with a liquid from a liquid tank (not shown) provided for the corresponding color via a liquid supply tube. The liquid ejection heads 11 are each formed with a plurality of nozzles in a direction orthogonal to the conveyance direction of the printing medium 2. By ejecting a liquid of any needed amount from these nozzles all at once to any target area, the printing medium 2 is formed thereon with minute liquid dots. With such dot formation performed on a color basis, printing can be performed only by passing once the printing medium 2 adhered to the conveyor belt 1, i.e., single-path printing. That is, the area where these liquid ejection heads 11 are disposed corresponds to the printing area. In this embodiment, the reference position is detected for the conveyor belt 1 in response to a belt reference signal that will be described later, and based on the detected reference position, a liquid is ejected with the timing of a belt position signal that will be described later.

To eject a liquid from the nozzles of each of the liquid ejection heads, various methods can be applied, e.g., electrostatic ejection, piezo ejection, and film boiling. With the electrostatic ejection, when an electrostatic gap being an actuator is provided with a drive signal, an oscillation plate in a cavity is displaced in position so that the pressure in the cavity shows some change. This change of pressure ejects a liquid from the nozzles. With the piezo ejection, when a piezo element being an actuator is provided with a drive signal, an oscillation plate in a cavity is displaced in position so that the pressure in the cavity shows some change. This change of pressure ejects a liquid from the nozzles. With film boiling, a minute-sized heater is provided in a cavity, and a liquid is instantaneously heated to be 300 degrees or higher. As a result, the liquid is put in the film-boiling status so that air bubbles are generated. The resulting change of pressure ejects the liquid from the nozzles. The invention is applicable to all of these liquid ejection methods.

At one end portion of the conveyor belt 1 in the direction orthogonal to the conveyance direction of a printing medium, a magnetic recording layer 8 is formed. This magnetic recording layer 8 is formed as a continuous strip at the one end portion of the conveyor belt 1 along the conveyance direction of a printing medium. With this magnetic recording layer 8, a contact-type magnetic reproduction head 9 comes in contact. The magnetic recording layer 8 in this embodiment is recorded with information about the movement status of the conveyor belt 1, and about the reference position of the conveyor belt 1. The recording details reproduced from the magnetic recording layer 8 by the magnetic reproduction head 9 are detected by a control device 6. Based on the information detected as such by the control device 6, i.e., about the movement status of the conveyor belt 1, and the reference position of the conveyor belt 1, i.e., the conveyance status of the printing medium 2, the gate roller motor 14 is driven so that the printing medium 2 is supplied to the conveyor belt 1. Also the drive roller motor 7 is driven to convey the printing medium 2 to a printing area, and the liquid ejection heads 11 are each driven to eject a liquid onto the printing medium 2 for printing.

Figure 3:
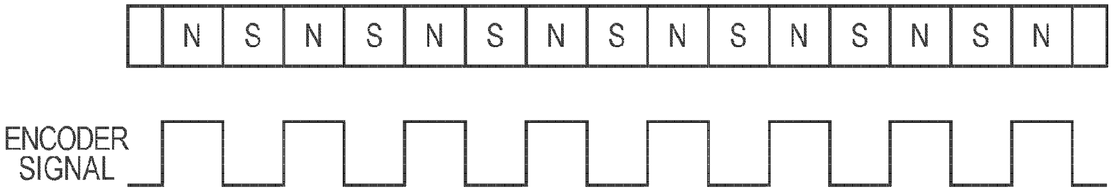
FIG. 3 is a diagram for illustrating, as a first embodiment, the recording details recorded on a magnetic recording layer of FIG. 2 about a magnetic pole change with a predetermined recording pitch, and an output signal from a magnetic reproduction head.
Figure 4:
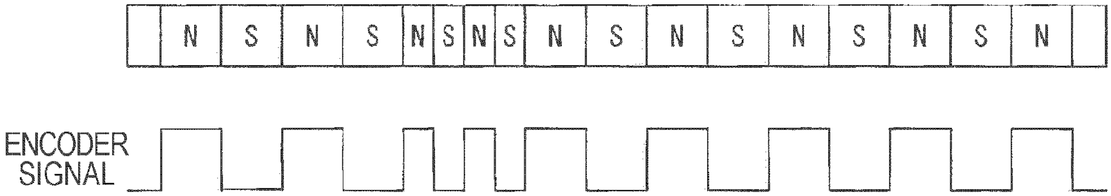
FIG. 4 is a diagram for illustrating, as the first embodiment, the recording details recorded on the magnetic recording layer of FIG. 2 about a magnetic pole change with a recording pitch different from the predetermined recording pitch, and an output signal from the magnetic reproduction head.

FIGS. 3 and 4 show the recording details recorded on the magnetic recording layer 8 about a magnetic pole change. FIG. 3 shows a pattern of magnetic pole change recorded on, almost in its entirety, the magnetic recording layer 8 of the conveyor belt 1. With the pattern of FIG. 3, the magnetic poles of N and S are changed with a predetermined recording pitch. FIG. 4 shows the recording details recorded only on a part of the magnetic recording layer 8 of the conveyor belt 1 about a magnetic pole change with a recording pitch different from the predetermined pitch of FIG. 3. With the pattern of FIG. 4, the magnetic poles of N and S are changed with a recording pitch being an integral submultiple of the predetermined recording pitch of FIG. 3, e.g., a half in this embodiment. As such, with the recording details about a magnetic pole change with the predetermined recording pitch of FIG. 3, when an output signal (encoder signal in the drawing) of the magnetic reproduction head 9 becomes Hi in level with an N-pole and Low in level with an S-pole, a belt position signal (pulse) may be output for every rising edge of the output signal of the magnetic reproduction head 9 for the aim of detecting the movement status of the conveyor belt 1. When the recording details of FIG. 4 are detected, i.e., the recording details about a magnetic pole change with a recording pitch different from the predetermined recording pitch, a belt reference signal indicating the reference position of the conveyor belt 1 may be output. Such signal output favorably eliminates the need to make a reference setting such as tab, and to include a reference detection unit such as tab sensor.

Figure 5:
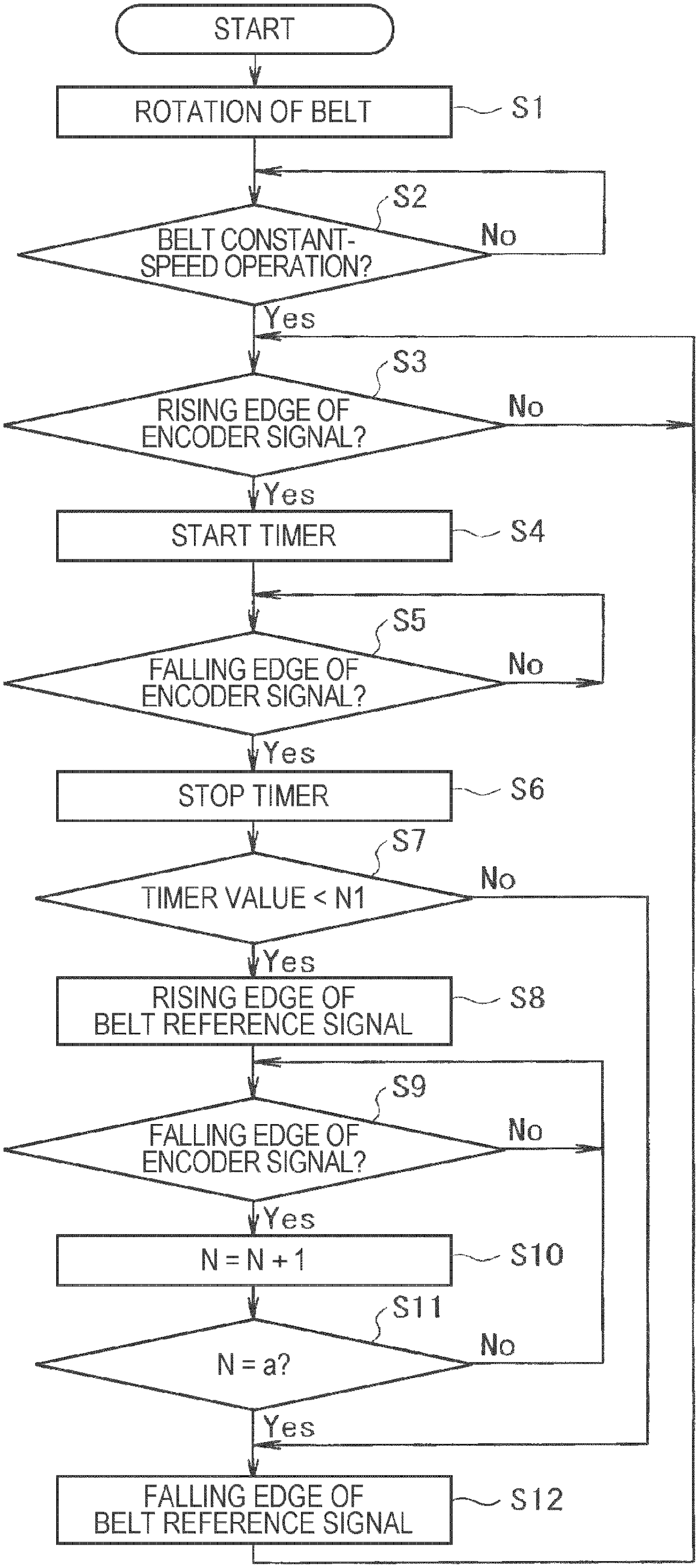
FIG. 5 is a flowchart of an operation process for outputting a belt reference signal in the first embodiment.

FIG. 5 is a flowchart of an operation process for outputting a belt reference signal in the control device 6 of FIG. 2. This operation process is started simultaneously with a printing command. In this operation process, first of all in step S1, the drive roller motor 7 is rotate-driven so that the conveyor belt 1 is rotated.

Then in step S2, a determination is made whether the conveyor belt 1 is put in the state of constant speed. When the conveyor belt 1 is put in the state of constant speed, the procedure goes to step S3, and when not, the device is put in a standby mode.

In step S3, a determination is made whether an output signal (encoder signal in the drawing) from the magnetic reproduction head 9 is on the rising edge or not. When the output signal from the magnetic reproduction head 9 is on the rising edge, the procedure goes to step S4, and when not, the device is put in a standby mode.

In step S4, counting of a timer is started.

The procedure then goes to step S5, and a determination is made whether the output signal (encoder signal in the drawing) from the magnetic reproduction head 9 is on the falling edge or not. When the output signal from the magnetic reproduction head 9 is on the falling edge, the procedure goes to step S6, and when not, the device is put in a standby mode.

In step S6, counting of the timer is stopped.

The procedure then goes to step S7, and a determination is made whether the count value of the timer is smaller than a predetermined value N1, which is a previously-set value. When the count value of the timer is smaller than the predetermined value N1, the procedure goes to step S8, and when not, the procedure goes to step S12. Note here that the predetermined value N1 is so set as to be smaller than a pitch time for the N-pole with the predetermined recording pitch, and be larger than a pitch time for the N-pole being an integral submultiple (a half) of the predetermined recording pitch.

In step S8, a belt reference signal is put on the rising edge.

Then the procedure goes to step S9, and a determination is made whether the output signal (encoder signal in the drawing) from the magnetic reproduction head 9 is on the falling edge or not. When the output signal from the magnetic reproduction head 9 is on the falling edge, the procedure goes to step S10, and when not, the device is put in a standby mode.

In step S10, a counter N is incremented, and then the procedure goes to step S11.

In step S11, a determination is made whether the counter N is a predetermined value a, which is a previously-set value. When the counter N is the predetermined value a, the procedure goes to step S12, and when not, the procedure returns to step S9. Note here that the predetermined value a is a value as a result of subtracting 1 from an "integer" of the integral submultiple of the predetermined pitch. That is, in this embodiment, because the "integer" is 2, the predetermined value a is 1.

In step S12, the belt reference signal is put on the falling edge, and then the procedure returns to step S3.

Figure 6:
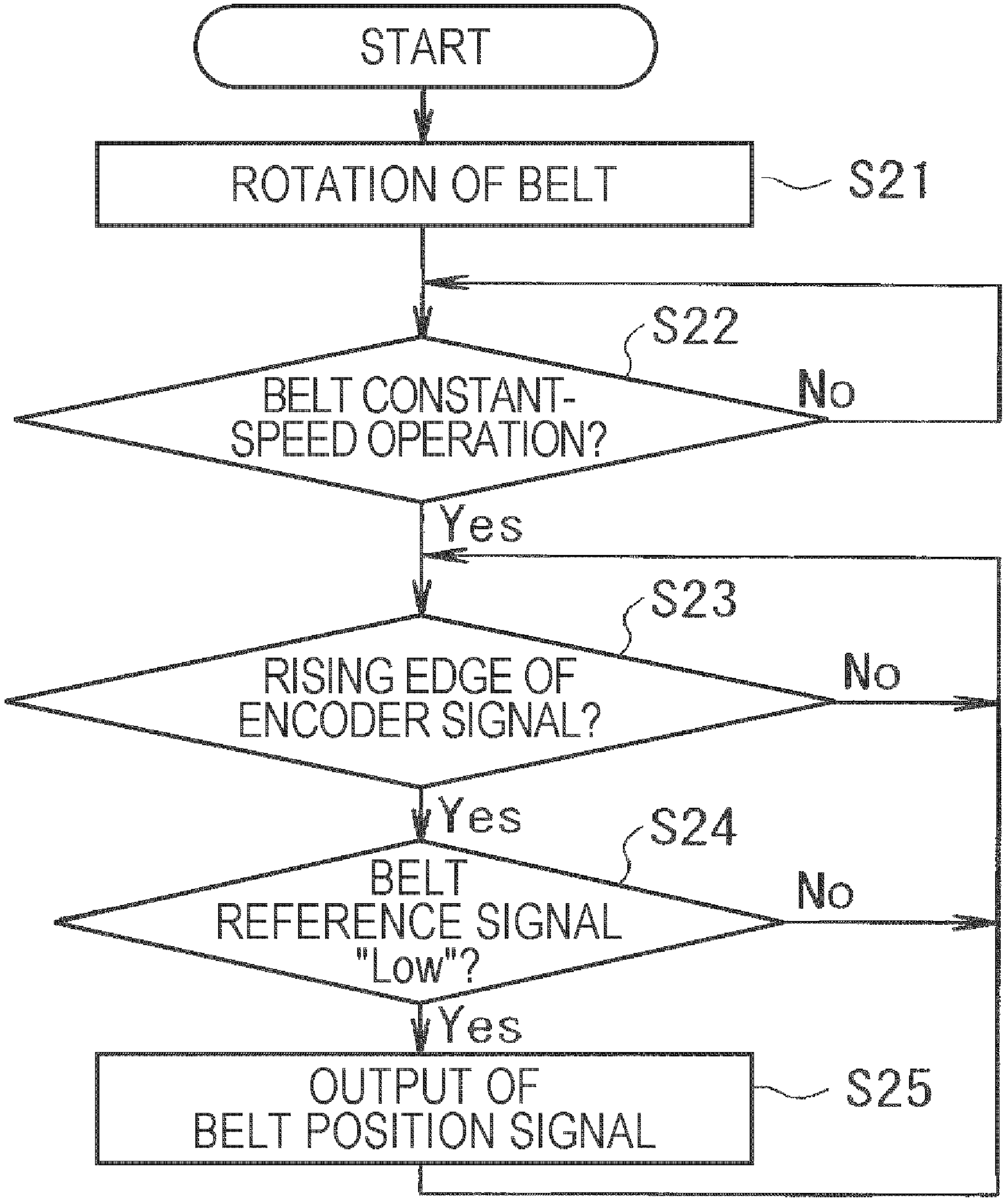
FIG. 6 is a flowchart of an operation process for outputting a belt position signal in the first embodiment.

FIG. 6 is a flowchart of an operation process for outputting a belt position signal in the control device 6 of FIG. 2. The operation process is started simultaneously with a printing command. In this operation process, first of all in step S21, the drive roller motor 7 is rotate-driven so that the conveyor belt 1 is rotated.

Then in step S22, a determination is made whether the conveyor belt 1 is put in the state of constant speed. When the conveyor belt 1 is put in the state of constant speed, the procedure goes to step S23, and when not, the device is put in a standby mode.

In step S23, a determination is made whether an output signal (encoder signal in the drawing) from the magnetic reproduction head 9 is on the rising edge or not. When the output signal from the magnetic reproduction head 9 is on the rising edge, the procedure goes to step S24, and when not, the device is put in a standby mode.

In step S24, a determination is made whether the belt reference signal is Low in level (S-pole). When the belt reference signal is Low in level, the procedure goes to step S25, and when not, the procedure returns to step S23.

In step S25, a belt position signal is output, and then the procedure returns to step S23.

Figure 7:
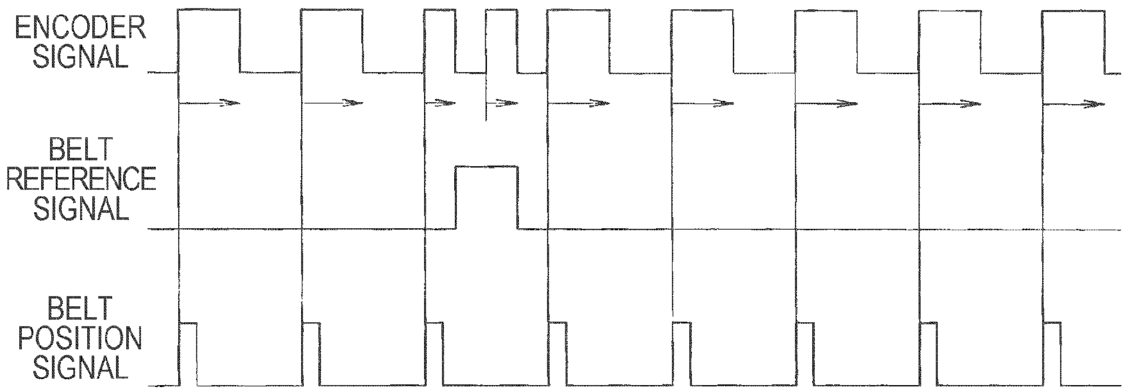
FIG. 7 is a timing chart of the belt reference signal and the belt position signal as a result of the operation processes of FIGS. 5 and 6.

FIG. 7 is a timing chart of a belt position signal and a belt reference signal being output results by the operation processes as above. First of all, a timer counts the time between every rising and falling edges of an output signal (encoder signal in the drawing) of the magnetic reproduction head 9. Herein, if with a predetermined recording pitch, the count value of the timer for the time between the rising and falling edges of the signal is equal to or larger than the predetermined value N1. Therefore, no belt reference signal is output. On the other hand, if with recording details about a magnetic pole change with a recording pitch different from the predetermined recording pitch, the count value of the timer for the time between the rising and falling edges of the signal is smaller than the predetermined value N1. Therefore, a belt reference signal is put on the rising edge after the falling edge thereof. Thereafter, when the number of the falling edges, i.e., the counter value N reaches the predetermined value a (1 in this embodiment), a belt reference signal is put on the falling edge. That is, while the belt reference signal is being Hi in level, no recording details about a magnetic pole change are detected. As such, when a belt reference signal is Low in level, a belt position signal is output with any rising edge of the output signal from the magnetic reproduction head 9. On the other hand, when a belt reference signal is Hi in level, no belt position signal is output. That is, no belt position signal is output for any magnetic pole change made with a recording pitch different from the predetermined recording pitch, and thus a belt position signal is output whenever necessary with a predetermined recording pitch.

As such, according to the printing apparatus of the first embodiment, the magnetic recording layer 8 is recorded with recording details about a magnetic pole change with a predetermined recording pitch, and a part of the magnetic recording layer 8 is recorded with recording details about a magnetic pole change different from that with the predetermined recording pitch. Such recording details are reproduced from the magnetic recording layer 8 by the magnetic reproduction head 9. From the reproduction results, i.e., the recording details about a magnetic pole change with a predetermined recording pitch, the movement status of the conveyor belt 1 is detected, and from the recording details about a magnetic pole change different from that with the predetermined pitch, the reference position of the conveyor belt 1 is detected. As such, a single piece of the magnetic reproduction head 9 can detect both the movement status of the conveyor belt 1 and the reference position thereof.

Moreover, the recording details about a magnetic pole change with a predetermined recording pitch show a pattern of changing a magnetic pole with a predetermined recording pitch, and the recording details about a magnetic pole change different from that by the predetermined recording pitch show a pattern of changing a magnetic pole with a recording pitch being an integral submultiple of the predetermined recording pitch. This accordingly eases detection of the movement status of the conveyor belt 1 from the recording details about a magnetic pole change with a predetermined recording pitch, and detection of the reference position of the conveyor belt 1 from the recording details about a magnetic pole change different from that with the predetermined recording pitch.

Described next is a printing apparatus in a second embodiment of the invention. The schematic configuration of the printing apparatus of this embodiment is the same as that of FIGS. 1 and 2 of the first embodiment. In the second embodiment, recording details recorded on the magnetic recording layer 8 about a magnetic pole change are different from those in the first embodiment.

Figure 8:
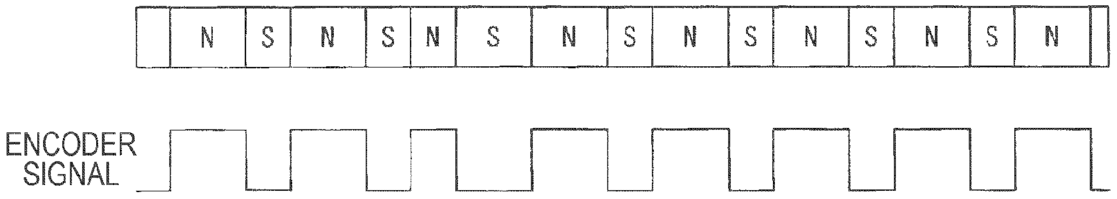
FIG. 8 is a diagram for illustrating, as a second embodiment, the recording details recorded on the magnetic recording layer of FIG. 2 about a magnetic pole change with a predetermined recording duty and about a magnetic pole change with a recording duty different from the predetermined recording duty, and an output signal from a magnetic reproduction head.

FIG. 8 is a diagram showing the recording details recorded on the magnetic recording layer 8 about a magnetic pole change in the second embodiment. In this embodiment, in the recording details recorded on the magnetic recording layer 8 in its entirety about a magnetic pole change of a predetermined pattern, a recording duty for one magnetic pole, e.g., N-pole, is set constant in a period of a magnetic pole change (if with a constant period of a magnetic pole change, a recording duty for the remaining magnetic pole, e.g., S-pole, is also set constant). In the recording details about a magnetic pole change different from that of a predetermined pattern formed to a part of the magnetic recording layer 8, a recording duty for one magnetic pole, e.g., N-pole, is set different in a period of a magnetic pole change (if with a constant period of a magnetic pole change, a recording duty for the remaining magnetic pole, e.g., S-pole, is also set different. As to the output signal (encoder signal in the drawing) from the magnetic reproduction head 9, an ON duty (or OFF duty) of the signal is different. That is, with a predetermined pattern, an ON duty corresponding to the N-pole is large, i.e., longer ON time, and with a pattern different from the predetermined pattern, the OFF duty corresponding to the S-pole is large, i.e., longer OFF time.

Figure 9:
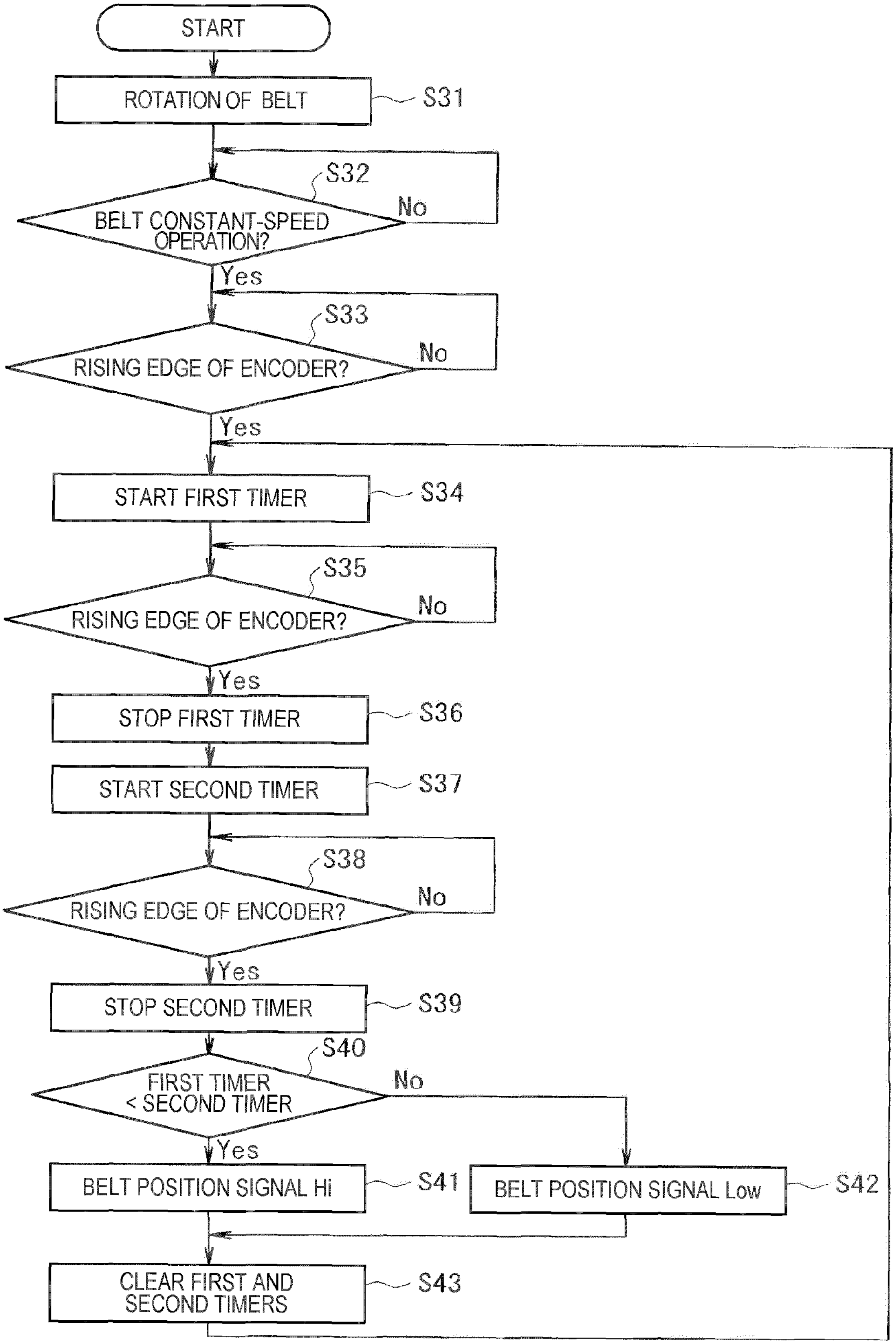
FIG. 9 is a flowchart of an operation process for outputting a belt reference signal in the second embodiment.

FIG. 9 is a flowchart of an operation process for outputting a belt reference signal in the control device 6 of FIG. 2. This operation process is started simultaneously with a printing command. Note that, in this embodiment, the belt position signal in the first embodiment may be output at the timing of every rising edge of the output signal from the magnetic reproduction head 9. In this operation process, first of all in step S31, the drive roller motor 7 is rotate-driven so that the conveyor belt 1 is rotated.

Then in step S32, a determination is made whether the conveyor belt 1 is put in the state of constant speed. When the conveyor belt 1 is put in the state of constant speed, the procedure goes to step S33, and when not, the device is put in a standby mode.

In step S33, a determination is made whether an output signal (encoder signal in the drawing) from the magnetic reproduction head 9 is on the rising edge or not. When the output signal from the magnetic reproduction head 9 is on the rising edge, the procedure goes to step S34, and when not, the device is put in a standby mode.

In step S34, counting of a first timer is started.

The procedure then goes to step S35, and a determination is made whether the output signal (encoder signal in the drawing) from the magnetic reproduction head 9 is on the falling edge or not. When the output signal from the magnetic reproduction head 9 is on the falling edge, the procedure goes to step S36, and when not, the device is put in a standby mode.

In step S36, counting of the first timer is stopped.

The procedure then goes to step S37, and counting of a second timer is started.

Then the procedure goes to step S38, and a determination is made whether the output signal (encoder signal in the drawing) from the magnetic reproduction head 9 is on the rising edge or not. When the output signal from the magnetic reproduction head 9 is on the rising edge, the procedure goes to step S39, and when not, the device is put in a standby mode.

In step S39, counting of the second timer is stopped.

The procedure then goes to step S40, and a determination is made whether the count value of the first timer is smaller than the count value of the second timer. When the count value of the first timer is smaller than the count value of the second timer, the procedure goes to step S41, and when not, the procedure goes to step S42.

In step S41, the belt reference signal is changed in level to Hi, and the procedure goes to step S43.

In step S42, the belt reference signal is changed in level to Low, and the procedure goes to step S43.

In step S43, the count values of the first and second timers are both cleared, and the procedure then returns to step S34.

Figure 10:
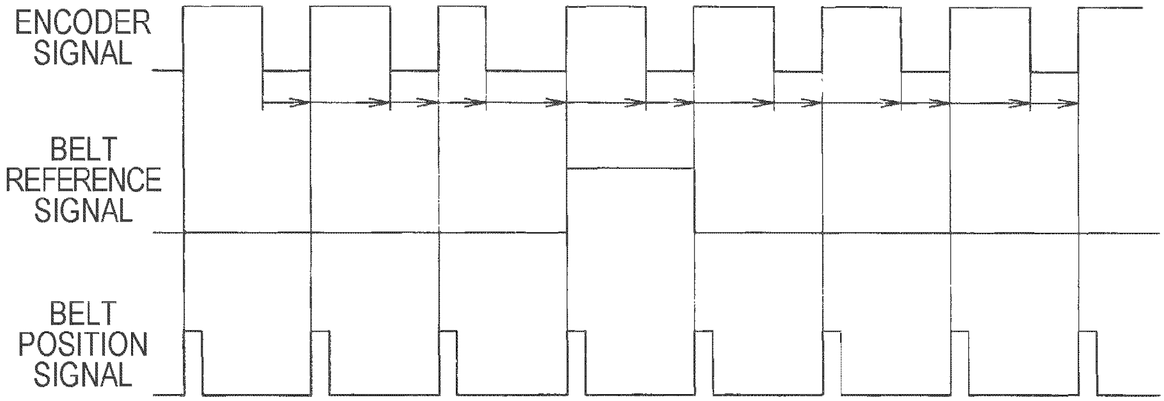
FIG. 10 is a timing chart of the belt reference signal and a belt position signal as a result of the operation process of FIG. 9.

FIG. 10 is a timing chart of a belt position signal and a belt reference signal being output results by the operation processes as above. Note here that the belt position signal is output for every rising edge of the output signal (encoder signal in the drawing) of the magnetic reproduction head 9. At every rising edge of the output signal (encoder signal in the drawing) of the magnetic reproduction head 9, the time before the falling edge is counted by the first timer, and at every falling edge thereof, the time before the rising edge is counted by the second timer. Herein, with a predetermined pattern, the count value of the first timer from the rising edge to the falling edge is larger than the count value of the second timer from the falling edge to the rising edge. The belt reference signal thus remains Low in level. On the other hand, with the recording details about a magnetic pole change of a pattern different from the predetermined pattern, the count value of the first timer from the rising edge to the falling edge is smaller than the count value of the second timer from the falling edge to the rising edge. The belt reference signal is changed in level to Hi with the next rising edge thereof. After a period of the next predetermined pattern, when the signal is put on the rising edge with the next predetermined pattern, the belt reference signal is changed in level to Low.

According to the printing apparatus of the second embodiment, in addition to the effects achieved in the first embodiment, in the recording details about a magnetic pole change of a predetermined pattern, when a recording duty for one magnetic pole is set constant in a period of a magnetic pole change, in the recording details about a magnetic pole change different from that of a predetermined pattern, a recording duty for the remaining magnetic pole is set different in a period of a magnetic pole change. This accordingly eases detection of the movement status of the conveyor belt 1 from the recording details about a magnetic pole change of a predetermined pattern, and detection of the reference position of the conveyor belt 1 from the recording details about a magnetic pole change different from that of the predetermined pattern.

Described in detail in the second embodiment is the example of applying a printing apparatus of the invention to a line-head printing apparatus. The printing apparatus of the invention is surely applicable not only to a multi-path printing apparatus but also to various types of printing apparatuses.

The components configuring the printing apparatus or the printing medium conveying apparatus in the embodiments of the invention may be replaced with any other arbitrary components that can achieve the functions of the same level, or any other arbitrary components may be additionally provided.

A liquid to be ejected from the liquid ejection heads in the embodiments of the invention is not specifically restrictive, and a liquid (dispersion solution such as suspension and emulsion included) containing various other materials as below will do, for example. That is, the materials include an ink including a filter material of a color filter, a light-emitting material for forming an EL (Electro Luminescence) light-emitting layer in an organic EL device, a fluorescent material for forming a fluorescent body on an electrode in an electron emission device, a fluorescent material for forming a fluorescent body in a PDP (Plasma Display Panel) device, an electrophoresis material for forming an electrophoresis body in an electrophoresis display device, a bank material for forming a bank on the surface of a substrate of a substrate W, various coating materials, a liquid electrode material for forming an electrode, a particle material for configuring a spacer for configuring a minute-sized cell gap between two substrates, a liquid metal material for forming a metal wiring pattern, a lens material for forming a microlens, a resist material, a light diffusion material for forming a light diffuser, and others.

In the invention, a printing medium being a target for liquid ejection is not restrictive to a paper such as recording paper, and possible options include any other media such as film, fabric, nonwoven fabric, and others, and workpieces such as glass substrate, silicon substrate, and others.

The entire disclosure of Japanese Patent Application Numbers: 2006-230461, filed Aug. 28, 2006 and 2007-212552, filed Aug. 17, 2007 are expressly incorporated by reference herein.

What is claimed is:

1. A printing apparatus that conveys a printing medium placed on a surface of a conveyor belt, and performs printing to the printing medium by ejecting a liquid from a liquid ejection head, the apparatus comprising:

a magnetic recording layer that is formed to the conveyor belt as a continuous strip, the magnetic recording layer having recording details about a magnetic pole change which has a first portion with a predetermined constant pitch with recording details about a magnetic pole change, and which has a reference portion formed integrally with the first portion with a pitch which is an integral submutiple of the predetermined pitch of the first portion;

a magnetic reproduction head that is disposed opposing the magnetic recording layer of the conveyor belt; and a control unit that detects recording details reproduced from the magnetic recording layer by the magnetic reproduction head, wherein the control unit detects a movement status of the conveyor belt by the magnetic reproduction head reproducing the the recording details recorded in the first portion of the magnetic recording layer, and wherein the control unit detects a position of the conveyor belt when the magnetic reproduction head reproduces the recording details recorded in the reference portion.

2. The printing apparatus according to claim 1, wherein the magnetic pole change in the first portion of the magnetic recording layer is constant and wherein the control unit detects the position of the conveyor belt when the magnetic pole change of the recording details reproduced by the magnetic reproduction head have a higher frequency than the constant magnetic pole change of the first portion.

3. A printing medium conveying apparatus, comprising:

a magnetic recording layer that is formed to the conveyor belt as a continuous strip, the magnetic recording layer having recording details about a magnetic pole change which has a first portion with a predetermined constant pitch with recording details about a magnetic pole change, and which has a reference portion formed integrally with the first portion with a pitch which is an integral submutiple of the predetermined pitch of the first portion;

a magnetic reproduction head that is disposed opposing the magnetic recording layer of the conveyor belt; and a control unit that detects recording details reproduced from the magnetic recording layer by the magnetic reproduction head, wherein the control unit detects a movement status of the conveyor belt by the magnetic reproduction head reproducing the recording details recorded in the first portion of the magnetic recording layer, and wherein the control unit detects a position of the conveyor belt when the magnetic reproduction head reproduces the recording details recorded in the reference portion.

4. The printing medium conveying apparatus according to claim 3, wherein the magnetic pole change in the first portion of the magnetic recording layer is constant and wherein the control unit detects the position of the conveyor belt when the magnetic pole change of the recording details reproduced by the magnetic reproduction head have a higher frequency than the constant magnetic pole change of the first portion.

* * * * *